Sept. 10, 1968     H. BLADES ET AL     3,401,140
METHYLENE CHLORIDE SOLUTION OF POLYETHYLENE TEREPHTHALATE
Original Filed Oct. 22, 1965
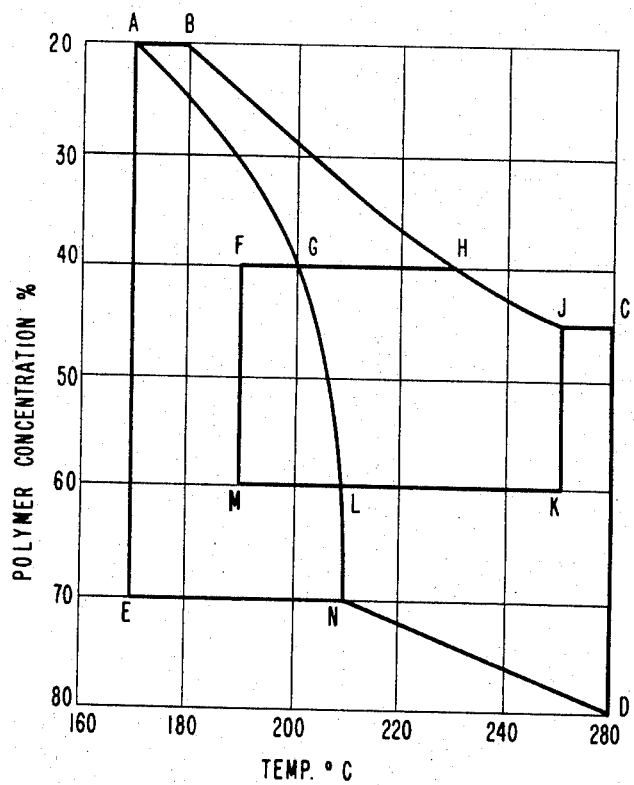
INVENTORS
HERBERT BLADES
JAMES RUSHTON WHITE
BY
ATTORNEY United States Patent Office 3,401,140
Patented Sept. 10, 1968

3,401,140
METHYLENE CHLORIDE SOLUTION OF
POLYETHYLENE TEREPHTHALATE
Herbert Blades, Wilmington, Del., and James R. White, Chapel Hill, N.C., assignors to E. I. du Pont de Nemours and Company, Wilmington, Del., a corporation of Delaware
Continuation of application Ser. No. 501,610, Oct. 22, 1965. This application Mar. 8, 1967, Ser. No. 633,324
10 Claims. (Cl. 260—33.8)

ABSTRACT OF THE DISCLOSURE

Polyethylene terephthalate solutions in methylene chloride can be prepared that are useful for the preparation of fibers and other shaped articles.

Description of the invention

This invention relates to polymer solutions and more particularly to solutions of polyethylene terephthalate in methylene chloride. This application is a continuation of application Ser. No. 501,610 which is a continuation-in-part of application Ser. No. 354,192, filed Feb. 10, 1964 (now U.S. Patent 3,227,784), which is a division of U.S. application Ser. No. 170,187, filed Jan. 31, 1962 (now U.S. Patent 3,227,664), which is a continuation-in-part of applications Ser. Nos. 858,725 and 858,772, filed Dec. 10, 1959 (both now abandoned), and Ser. No. 736,337, filed May 19, 1958, (now abandoned), which are in turn continuations-in-part of application Ser. No. 665,099, filed June 11, 1967 (also now abandoned).

The polymer solutions of this invention are composed of 10 to 80 percent by weight of polyethylene terephthalate dissolved in an organic solvent medium, at least about 75% by weight of which solvent medium is methylene chloride. Said solutions are maintained at a temperature between 170° C. and 260° C. and under at least autogenous pressure.

The polymer solutions described above are useful for the preparation of fibers or other shaped articles. As will be further understood from the discussion hereinafter, such articles may comprise ultramicrocellular or plexifilamentary structures as described in detail in U.S. Patent 3,227,664 and U.S. Patent No. 3,081,519, respectively.

That methylene chloride can serve as an outstandingly useful solvent for polyethylene terephathalate, under elevated temperature and pressure conditions, is surprising since heretofore polyethylene terephthalate has been regarded as insoluble or, at best, only very slightly soluble in low-boiling organic liquids, particularly ones that are unobjectionable for commercial fiber spinning processes.

The polymer solutions of this invention may be maintained, under the temperature and pressure conditions indicated, in a pressure vessel of any suitable type.

Polyethylene terephthalate polymer suitable for forming the solutions of this invention should be of at least film-forming molecular weight; i.e., it is a high polymer material.

The term polyethylene terephthalate as used herein is intended to cover homopolymers as well as copolymers, such as polyethylene terephthalate/isophthalate in varying proportions by weight, but preferably at least 50% of ethylene terephthalate units. Such copolymers, while not necessarily preferred, also form useful spinning solutions in methylene chloride. It is well known that the copolymers are usually more soluble in a given organic solvent, but increasing degrees of copolymerization modify certain desirable properties of polyethylene terephthalate homopolymer. The surprising feature of this invention is that the homopolymer is completely soluble over a broad range of temperature and composition.

For certain purposes, the polymer solutions will preferably contain 20 to 80% by weight of polyethylene terephthalate. Preferably at least 79% by weight of the organic solvent medium will be methylene chloride. The remainder may be a perhaloalkane, e.g., a fluorinated or chlorofluorinated alkane of 1 to 2 carbons.

FIGURE 1 is a portion of the concentration-temperature phase diagram for polyethylene terephthalate/methylene chloride binary systems. Polymer concentration for the ordinate is expressed as weight percent of polymer based on the whole solution, and "concentration" as used hereinafter is understood to have this meaning.

With reference to FIGURE 1, the line AGLND is the melting curve at autogenous pressure. The meaning of "melting curve" is clear from the following. If solid polymer and solvent are mixed at a specified concentration level and heated under autogeneous pressure, solid and solution phases are in equilibrium for all temperatures lower than that on the melting curve for that concentration. At higher temperatures, a single-phase solution results. Because the melting point varies slightly with polymer molecular weight and because of experimental difficulties in determining precisely the temperature at which complete solubility occurs, the melting curve is more properly a band deviating about ±5% in concentration from line AGLND.

Substantial degrees of undercooling of the solutions are possible so that the freezing curve (as observed within a reasonable time scale) comes at considerably lower temperatures than the melting curve. Line AE represents the lower practical limit of temperatures for maintaining one-phase solutions, which limit is also molecular weight dependent. Such undercooled solutions—even through metastable—perform satisfactorily.

Curve BHJC is the single-phase boundary for autogenous pressures. Between the belting curve and this single-phase boundary, the solution is one liquid phase. At temperatures greater than those indicated by Curve BHJC, two liquid phases form unless sufficient superautogenous pressure is applied to prevent phase separation. As is readily understood, the precise location of curve BHJC is also slightly affected by the molecular weight of the polymer employed. Pressures substantially in excess of autogenous are, of course, frequently employed at temperatures lower than those represented on the single-phase boundary.

As disclosed in our copending application Ser. No. 354,192, the area ABCDE of FIGURE 1 represents conditions which lead to microcellular structures, and area FHJKM is the preferred operating area. Solutions corresponding to the area above and to the right of curve BHJC can lead to the plexifilamentary structures of U.S. Patent No. 3,081,519.

It is not necessary that pure methylene chloride be used as solvent medium, as long as at least about 75% by weight is methylene chloride. The remainder can be any of a number of soluble, organic additives.

When super-autogenous pressures are desired, they may readily be obtained by dissolving a lower boiling additive. Although any soluble low-boiling material is suitable, the preferred materials are those which are super-critical at temperatures above the polymer melting point. Useful additives include $N_2$, $CO_2$ He, $He_2$, methane, ethane, propylene, ethylene, certain fluorinated and/or chlorinated methanes and ethanes, and equivalents.

A solvent medium composed of methylene chloride and a soluble additive should be an "activating liquid" as defined in application Ser. No. 354,192. Specifically, the solvent medium employed: (1) should have a normal boiling point at least 25° C. less than the polymer melting point; (2) should be substantially unreactive with the polymer during mixing and extrusion; (3) should be a solvent for the polymer under the conditions of temperature, concentration, and pressure suitable for the solutions of this invention; (4) should dissolve less than about 1% of the polymer at or below its boiling point; and (5) should form a solution which will undergo rapid vaporization upon extrusion to form a non-gel polymer phase. Thus, suitable additives need not necessarily fit requirements 1 to 5 above, but they must, of course, be soluble in polyethylene terephthalate/methylene chloride solutions.

In general, the use of additives to the solvent medium shifts the melting curve AGLND to higher temperatures and the single-phase boundary BHJC to lower temperatures. As can be seen in FIGURE 1, this narrows the concentration-temperature range in which single-phase solutions are stable at autogenous pressures, and still higher pressures are more frequently required.

Inert, insoluble, solid particulate materials can be dispersed throughout the solutions of this invention. One method for providing a large number of bubble nuclei at the instant of extrusion is to incorporate solid nucleating agents in the polymer solution.

This invention is further illustrated by the following examples.

EXAMPLE I 400 grams of polyethylene terephthalate polymer (relative viscosity=50, vacuum oven dried at 120° C. for 24 hours) and 250 ml. of methylene chloride (dried over calcium hydride) were charged to a 1 liter pressure vessel, 70 grams of dichlorodifluoromethane (e.g., "Freon 12") was added and the vessel was closed, heated to 210° C. while turning end over end, held at 210° for ten minutes, cooled to 191° C., held 15 minutes, positioned vertically, and pressured with 800 p.s.i. nitrogen. The solution was spun at a velocity of approximately 3,000 y.p.m. (2700 m./min.) through a 20 mil (0.51 mm.) diameter hole 28 mils (0.71 mm.) long and the fiber collected in a barrel. After heating for 15 minutes at 100° C. to expel residual solvent and realize maximum inflation, the microcellular product is a continuous, smooth, turgid fiber, density=0.023 g./cc., tenacity=0.57 g.p.d., elongation=39%, modulus=2 g.p.d. and denier=1,000 (properties determined on boiled off filaments), relative viscosity of fiber=29.2. The yarn is stable to a 20 minute boil-off, elongating only 1.6%. The strand contains about $10^8$ cells/cc. The average cell diameter is 36 microns, the wall thickness 0.1 micron, and the polymer in the cell walls exhibits planar orientation to within 10 degrees. The cell walls exist in polyhedral configuration with substantially no polymeric material present other than that comprising the polyhedral cellular structure.

EXAMPLE II

A 2-inch (5.08 cm.) diameter Hartig extruder is modified by the addition of a 2-section barrel extension. The screw has a 15/1 $L/D$ feed section followed by a 4.5/1 $L/D$ metering section and a 9/1 $L/D$ torpedo mixing section. It is driven by a 25 HP motor with a Dynamatic adjustable speed coupling. The end of the extruder is fitted with an orifice 0.020 inch (0.508 mm.) in diameter with a 0.040 inch (1.016 mm.) land (preceded by a 100 mesh screen). The barrel is heated by means of eight individually controlled heaters.

A 21 weight percent solution of unsymmetrical trichlorotrifluoroethane in methylene chloride is fed from a graduated reservoir through a heating coil at 80° C. to an injection probe protruding into the flowing polymer stream by means of a Hills-McCanna Co., "McCanna-meter" diaphragm pump, model MA-888-D. The methylene chloride solution enters the polymer stream at the transition between the metering and the mixing sections.

A microcellular fiber is extruded under the following conditions.

Polyethylene terephthalate
(previously vacuum dried
at 100° C.) _____ 41.7 lb./hr. (18.9 kg./hr.).
1,1,2 - trichloro - 1,2,2 - trifluoroethane _____ 3.35 lb./hr. (1.52 kg./hr.).
Methylene chloride _____ 12.7 lb./hr. (5.77 kg./hr.).
Die melt temperature _____ 225° C.
Die pressure _____ 800–900 p.s.i. (56.3–63.3 kg./cm.$^2$).

Relative viscosity:
  Molding pellets _____ 35.
  Fiber _____ 28.

The yarn produced by this procedure was smooth surfaced and pneumatic and was composed of closed cells approximately 10–20 microns in diameter. The apparent density of the yarn is 0.04 g./cc.

EXAMPLE III

A 300 ml. pressure vessel is charged with 90 g. of polyethylene terephthalate (relative viscosity of 49), 90 ml. of methylene chloride, and 20 ml. of sym-dichlorotetrafluoroethane, heated to a temperature of 205° C. and extruded under a total pressure of 840 p.s.i.g. (59.1 kg./cm.$^2$ of nitrogen. The 0.012" (0.30 mm.) diameter orifice is preceded by a 200 mesh screen located 1" (2.54 cm.) away. As might be predicted from consideration of FIGURE 1, the initial product is a microcellular closed cell filament. However, after a few seconds' operation, the product produced is a plexifilamentary strand, due to the operation of a preflashing mechanism at the up-stream screen.

What is claimed is:

1. A polymer solution composed of 10 to 80 percent by weight of polyethylene terephthalate dissolved in an organic solvent medium consisting essentially of 75–100% methylene chloride and 0 to 25% of a perhaloalkane which at or below its boiling point is a nonsolvent for said polyethylene terephthalate maintained at a temperature between 170° C. and 260° C. and under at least autogenous pressure.

2. A pressure vessel containing the polymer solution according to claim 1.

3. The polymer solution of claim 1 wherein said solvent medium consists essentially of methylene chloride.

4. The polymer solution of claim 1 wherein said solvent medium contains at least 79% by weight of methylene chloride.

5. The polymer solution of claim 1 wherein said polyethylene terephthalate is a homopolymer.

6. The polymer solution of claim 1 wherein said solvent medium contains a member selected from the group consisting of unsym-trichlorotrifluoroethane, dichlorodifluoromethane and sym-dichlorotetrafluoroethane.

7. The polymer solution of claim 1 containing 20 to 80% by weight of polyethylene terephthalate.

8. A method for producing a spinning solution of polyethylene terephthalate in an organic solvent medium comprising introducing into a receptacle (A) polyethylene terephthalate and (B) a solvent medium consisting essentially of 75 to 100% methylene chloride and 0 to 25% of a perhaloalkane which at or below its boiling point is a nonsolvent for polyethylene terephthalate, the polyethylene terephthalate comprising between 10 and 80% by weight of the combination of A and B, closing the receptacle and heating the mixture therein with agitation to a temperature between 170° C. and 260° C. under at least autogenous pressure to obtain a homogeneous solution.

9. The process of claim 8 wherein the solvent medium is methylene chloride.

10. The process of claim 8 wherein the solvent medium includes a member selected from the group consisting of unsym-trichlorotrifluoroethane, dichlorodifluoromethane and sym-dichlorotetrafluoroethane.

References Cited

UNITED STATES PATENTS 2,743,250　4/1956　Sweet _____ 260—33.8

FOREIGN PATENTS 645,032　10/1950　Great Britain.
797,425　7/1958　Great Britain.

OTHER REFERENCES

Shepherd: Aerosols: Science and Technology, Interscience Pub., 1961, pp. 213–215.

JULIUS FROME, *Primary Examiner.*